Aug. 6, 1929.　　　　L. C. TINGLEY　　　　1,723,390
COVER PLATE FOR MEASURING INSTRUMENTS
Filed May 26, 1928
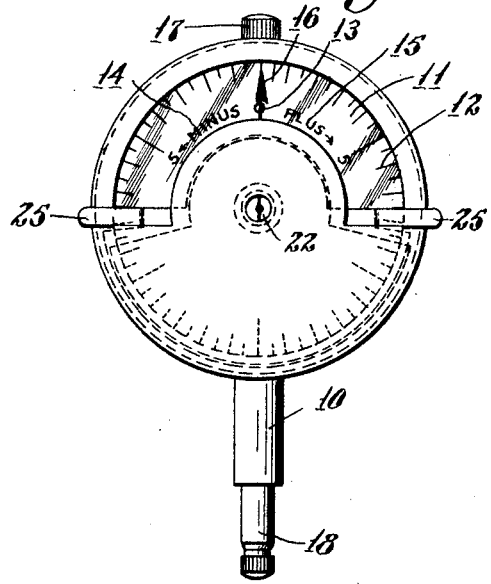
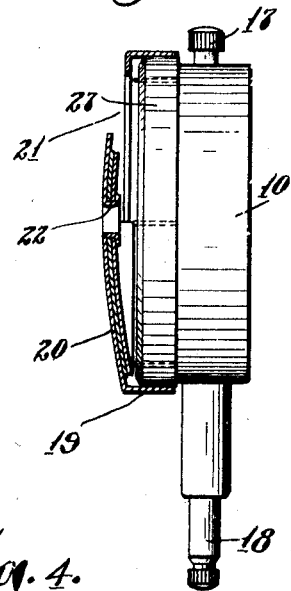
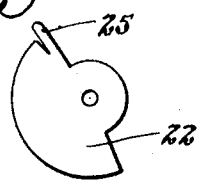
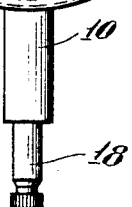
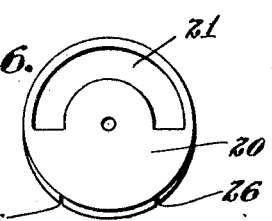
Inventor
Leonard C. Tingley
by James R. Hodder
Attorney Patented Aug. 6, 1929.

1,723,390

UNITED STATES PATENT OFFICE.

LEONARD C. TINGLEY, OF PROVIDENCE, RHODE ISLAND, ASSIGNOR TO FEDERAL PRODUCTS CORPORATION, OF PROVIDENCE, RHODE ISLAND, A CORPORATION OF RHODE ISLAND.

COVER PLATE FOR MEASURING INSTRUMENTS.

Application filed May 26, 1928. Serial No. 280,816.

My present invention relates to measuring instruments, and more particularly to an improved cover plate for indicating or measuring instruments.

An important use for precision indicating instruments is the testing of completed parts with respect to the size thereof. For example, in building machine parts it is many times essential that no part is shipped from a plant unless it is of a specified size. All such parts are ordinarily allowed a certain minute variation from the specified size, being allowed to be a certain measurement under the size or a certain measurement over the size, as for example, a part that is intended to be one inch in diameter will still be allowed to pass as a perfect article if it is, for example, three-thousandths of an inch under one inch in size, or, for example, two-thousandths greater than one inch in size. Precision indicating instruments as manufactured at the present day are utilized in this inspection work and are ordinarily provided with a dial face over which moves a rotatably mounted indicator hand and the dials of such precision measuring instruments may be graduated from a zero point either side thereof to indicate increase in size or decrease in size, or, as it is usually known, plus or minus. With the full face of the precision measuring instrument exposed, an operator who is doing inspection work is seriously hampered in that there is too great a scale over which close watch must be kept and the amount of work turned out by an inspector is seriously affected by this fact.

In my present invention, I have obviated the objections above enumerated and have devised an improved cover plate for precision measuring instruments which cover plate is provided with a plurality of movable shutters and by means of which as much of the graduated portion of either the plus or minus side of the device may be covered up. In this way, and if, as stated above, an article to be inspected is allowed to be three-thousandths under size and two-thousandths over size and still be within allowable limits or tolerances, then the movable members of the cover plate may be moved so that but three of the graduations on the minus side are exposed to view, while only two on the plus side are exposed. An inspector, therefore, inspecting articles with a precision measuring instrument, equipped with one of my improved cover plates need only measure the article and if the indicating hand of the instrument is visible, then the article measured is known to be correct within the allowable limits, whereas, if the indicating hand of the instrument is not visible, the inspector instantly knows that the instrument is too large or too small and as he is not concerned with other than the fact that the article must be within certain limits, he rejects the article without further consideration.

One of the objects of my invention, therefore, is an improved precision measuring instrument.

Another object of my invention is an improved cover plate for use in connection with precision measuring instruments.

In the accompanying drawings,

Fig. 1 is a front elevation of a precision measuring instrument to which my invention has been applied;

Fig. 2 is a side elevation of the instrument shown in Fig. 1 with the cover plate therefor shown in section;

Fig. 3 is an elevation similar to Fig. 1 but with the movable portions of the cover plate in adjusted position;

Fig. 4 is a development of one of the movable elements of the cover plate;

Fig. 5 is a development of the other of such movable elements, and

Fig. 6 is an elevation of the body of the cover plate.

Referring to the drawings, 10 designates a precision measuring instrument of a well known type provided with a side through which may be seen a circular dial 11, provided with graduations 12 about the periphery thereof, such gradations preferably and in the present instance reading from the zero point 13 to the right or left, those on the left being marked with a minus sign 14, and those on the right being marked with the plus sign 15. Also forming part of the precision measuring instrument and associated with the graduated dial 11 is a rotatably mounted indicating hand 16. The precision measuring instrument has extending from one end a limiting stop 17 rigidly attached to a movable plunger 18 extending from the opposite end, which plunger operates a train of gearing within the casing of the instrument to control the movement of the indicating hand 16. The distance between the outer end of the members 17 and 18 may be varied or may be a characteristic of the instrument and constitute the correct size of an article to be measured or inspected. It is obvious that if an operator utilizing the instrument above described and as illustrated in Fig. 1, is to measure an article for correctness of size that he will have to keep all of the graduations of the dial 11 under observation and each time read the number of graduations to the right or left of the zero mark 13 in order to determine whether or not the article he is inspecting comes within the limits allowed during the manufacture. This is extremely fatiguing to the operator and results in materially slowing down his output of work.

In the drawings, I have shown a cover plate consisting of an annular split ring 19, formed of resilient material of any desired kind and having formed integral therewith a cover 20, such cover being provided with a semi-circular sight 21. Centrally located on the inner face of the cover 20 and attached to such cover by a rivet 22 or in any other suitable manner so as to be rotatable with respect to the cover 20 are one or more segmental shutters 23 and 24. Each of the shutters 23 and 24 is provided with a radially extending operating finger 25, and the annular member 19 of spring material is provided with a plurality of slits 26 which allow the member 19 to firmly grip the bezel ring 27 of the measuring instrument 10. The segmental shutters 23 and 24, being assembled on the inner face of the cover 20, with the radially extending fingers thereof extending outward over beyond the limits of the annular ring 19 and being rotatable on the tubular rivet 22, it is obvious that such shutter 24 may be rotated so as to expose more or less, as may be desired, of the graduations 11 to the right or left of the zero mark 13.

If the device has been constructed as above described, and if we assume that it is desired to inspect a number of articles for size of an assumed length between the outer ends of the members 17 and 18, and that any article so inspected will be merchantable if it is, for example, three-thousandths less than such size, or two-thousandths over such size, then the operator by moving the shutter 23, to expose three of the minus graduations, to the left of the zero mark 13 and the shutter 24 to expose two of the plus graduations on the right of such zero graduation, then it is obvious that the operator will only have to watch the graduations that are exposed to view. In measuring an article, therefore, if the indicating hand 16 comes into view, whether to the right or to the left of the zero point 13, then the article measured is merchantable and passes inspection. On the contrary, if the indicating hand 16 does not come into view, it will be immaterial whether the article measured is too large or too small, it is summarily rejected. With this device, therefore, the inspector finds that his work is greatly speeded up and a great deal more work may be done with less fatigue than is possible with former devices.

Having thus described my invention, what I claim as new is:

1. In a device of the kind described, the combination of an annular supporting ring, a cover formed on one edge thereof and being provided with a semi-circular sight, a pair of co-operating shutters pivotally mounted to said cover and movable to expose more or less of the sight.

2. In a device of the kind described, the combination of an annular spring ring, a cover formed integral therewith at one edge thereof and being provided with a semi-circular sight, a pair of co-operating shutters rotatably mounted on the under face of the cover, operating fingers for said shutter plates and by means of which the shutter plates may be rotated to expose more or less of the semi-circular sight.

3. In a device of the kind described, the combination with a precision measuring instrument, having a graduated face, of a cover plate therefor comprising a spring ring adapted to engage with and be positioned on the bezel ring of the measuring instrument, a cover formed integral with the spring ring at one edge thereof and being provided with a semi-circular sight, a pair of co-operating shutters rotatably mounted on the cover and means for operating the same to expose more or less of the graduations visible through the semi-circular sight.

In testimony whereof, I have signed my name to this specification.

LEONARD C. TINGLEY.